(12) United States Patent
Sathish et al.

(10) Patent No.: US 8,543,532 B2
(45) Date of Patent: Sep. 24, 2013

(54) METHOD AND APPARATUS FOR PROVIDING A CO-CREATION PLATFORM

(75) Inventors: Sailesh Kumar Sathish, Tampere (FI); Tommi Juhani Lahti, Tampere (FI)

(73) Assignee: Nokia Corporation, Espoo (FI)

( * ) Notice: Subject to any disclaimer, the term of this patent is extended or adjusted under 35 U.S.C. 154(b) by 746 days.

(21) Appl. No.: 12/573,522

(22) Filed: Oct. 5, 2009

(65) Prior Publication Data

US 2011/0082825 A1  Apr. 7, 2011

(51) Int. Cl.
*G06F 17/00* (2006.01)

(52) U.S. Cl.
USPC .................................................. 706/55

(58) Field of Classification Search
USPC .................................................. 706/55
See application file for complete search history.

(56) References Cited

U.S. PATENT DOCUMENTS

| | | |
|---|---|---|
| 7,003,475 B1 | 2/2006 | Friedland et al. |
| 7,219,107 B2 | 5/2007 | Beringer |
| 7,457,764 B1 | 11/2008 | Bullock et al. |
| 2002/0087520 A1 | 7/2002 | Meyers |
| 2005/0114195 A1 | 5/2005 | Bernasconi |
| 2006/0212336 A1 | 9/2006 | Powers et al. |
| 2007/0195944 A1 | 8/2007 | Korenblit et al. |
| 2007/0203996 A1 | 8/2007 | Davitz et al. |
| 2008/0189163 A1 | 8/2008 | Rosenberg et al. |

OTHER PUBLICATIONS

John et al ("Collaborative Tagging and Expertise in the Enterprise" 2006).*
Farrell et al ("Socially Augmenting Employee Profiles with PeopleTagging" 2007).*
Budura et al ("Deriving Expertise Profiles From Tags" Aug 2009).*
Budura, A., et al.: Deriving Expertise Profiles from Tags (Abstract), 2009 International Conference on Computational Science and Engineering, Aug. 2009, http://www.computer.org/portal/web/csdl/doi/10.1109/CSE.2009.404.
A language modeling framework for expert finding, Balog et al., Information Processing and Management 45, 2009, pp. 1-19.
Formal Models for Expert Finding in Enterprise Corpora, Balog et al., Proceedings of the 29th Annual International ACM SIGIR Conference on Research and Development in Information Retrieval, Aug. 6-11, 2006, pp. 43-50.
International search report and written opinion for corresponding international application No. PCT/FI2010/050728 dated Jan. 24, 2011, pp. 1-14.

* cited by examiner

*Primary Examiner* — Lut Wong
(74) *Attorney, Agent, or Firm* — Ditthavong Mori & Steiner, P.C.

(57) ABSTRACT

An approach is provided for providing a co-creation platform. A co-creation application extracts tags from a plurality of information sources reflecting the expertise of a user. The co-creation application creates a model of the user's expertise by applying a probabilistic analysis on the extracted tags. The co-creation application collects assignment information including at least one or more specified areas of expertise, and matches the model of the user's expertise against the specified areas of expertise.

20 Claims, 14 Drawing Sheets

| Tags | Matching Probability |
|---|---|
| Veterinary | 0.03 |
| Dog | 0.02 |
| Cat | 0.01 |
| Groom | 0.01 |
| Canal | 0.01 |
| Adoption | 0.005 |
| Training | 0.003 |
| Treat | 0.002 |

METHOD AND APPARATUS FOR PROVIDING A CO-CREATION PLATFORM

BACKGROUND

Service providers (e.g., wireless, cellular, Internet, content, social network, etc.) and device manufacturers are continually challenged to deliver value and convenience to consumers by, for example, offering a co-creation platform for users, practitioners, and experts to generate content online or to accomplish a task in the real world. With this co-creation platform, users and businesses can find collaborators based on their expertise, skills, and availability. For example, internet journalism creates broad scope of news and multimedia content and promotes participatory publishing. With this co-creation platform, a TV station can organize local photographers to capture footage of severe weather and earthquakes on site and then broadcast the content in real time to the rest of the world. Such participatory journalism brings in strong end-user involvement as well as broader, faster, cheaper, and more accurate content delivery from the field.

SOME EXAMPLE EMBODIMENTS

According to one embodiment, a method comprises extracting tags from a plurality of information sources reflecting the expertise of a user. The method also comprises creating a model of the user's expertise by applying a probabilistic analysis on the extracted tags. The method further comprises collecting assignment information including at least one or more specified areas of expertise. The method further comprises matching the model of the user's expertise against the specified areas of expertise.

According to another embodiment, an apparatus comprising at least one processor, and at least one memory including computer program code, the at least one memory and the computer program code configured to, with the at least one processor, cause, at least in part, the apparatus to at least perform the following: extract tags from a plurality of information sources reflecting the expertise of a user, create a model of the user's expertise by applying a probabilistic analysis on the extracted tags, collect assignment information including at least one or more specified areas of expertise, and match the model of the user's expertise against the specified areas of expertise.

According to another embodiment, a computer-readable storage medium carrying one or more sequences of one or more instructions which, when executed by one or more processors, cause, at least in part, an apparatus to at least perform the following: extract tags from a plurality of information sources reflecting the expertise of a user, create a model of the user's expertise by applying a probabilistic analysis on the extracted tags, collect assignment information including at least one or more specified areas of expertise, and match the model of the user's expertise against the specified areas of expertise.

According to another embodiment, an apparatus comprises means for extracting tags from a plurality of information sources reflecting the expertise of a user. The apparatus also comprises means for creating a model of the user's expertise by applying a probabilistic analysis on the extracted tags. The apparatus further comprises means for collecting assignment information including at least one or more specified areas of expertise. The apparatus further comprises means for matching the model of the user's expertise against the specified areas of expertise.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 5 shows an example of matching probabilities among tags in a tag set, according to one embodiment;

DESCRIPTION OF SOME EMBODIMENTS

Examples of a method, apparatus, and computer program for providing a co-creation platform are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

With the explosion of user generated content and social media, an ever expanding amount of data are increasingly contributed by end-users. Social media is becoming a part of users' life and Internet question posting is popular for users who do not have time or inclination to research for answers. Some anonymous readers might reply to questions posted online with their existing knowledge or conduct research for the information. Some anonymous users even post informational and/or educational audio and video content on websites for people to share. Distinctions between professionals and amateurs are blurring, and the definitions of commercial, public, and community media are changing. However, the online information originating from these anonymous users is not always available and reliable.

The media industry is looking for new ways to engage consumers to participatory and conversational content co-creation of reliable information. It is noted that when creating assignments to provide content of interest or to answer the information requests, media houses or content providers put in tags (e.g., specifying assignment requirements and expertise for completing the assignment) for a brokering service to identify potential journalists to take the assignments. The media houses or content providers can use several tags from a pre-defined vocabulary to identify potential journalists.

Some assignments involve complex tasks and require more than one person to complete the tasks involved in the assignments. Several people with various sets of expertise with respect to those tags may be identified as a match to at least one of the tags. Sometimes the media houses or content providers desire specific expertise of certain individuals for a particular set of tags. In these cases, automatic grouping of people for different assignments become complicated yet critical. To organize a task force for generating useful and reliable contents, the media houses or content providers need a mechanism or a co-creation platform to organize one or more qualified and talented users, practitioners and experts for different assignments. However, there is currently no such a co-creation platform available to bring crowd sourcing and social collaboration to everyone by leveraging web technologies, intelligent matching and the internet community.

Figure 1:
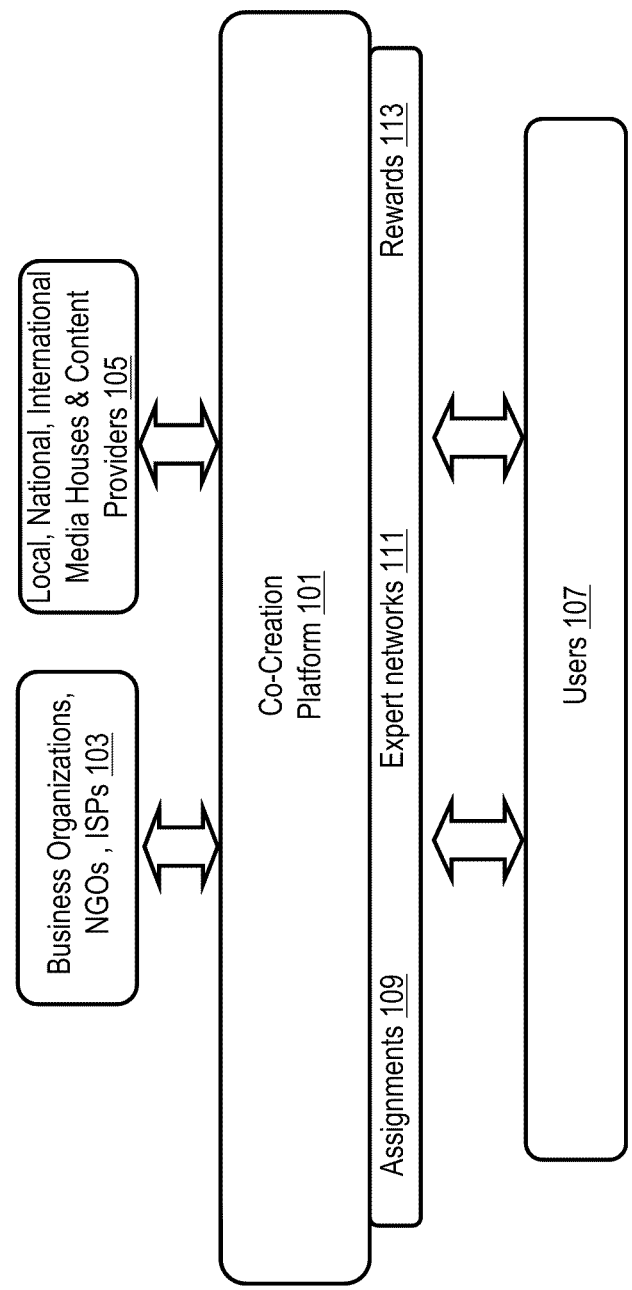
FIG. 1 is an overview of a co-creation platform architecture, according to one embodiment.

To address this problem, a co-creation platform architecture is introduced. FIG. 1 is an overview of the co-creation platform architecture, according to one embodiment. The co-creation platform 101 acts as a brokering service between business organizations, non-profit organizations, and internet service provider 103, local, national, international media houses and content providers 105, and users 107. For example, the media houses or content providers 105 need a group of users to produce photos of the UNESCO World Heritage sites in danger. The co-creation platform 101 matches content generating assignments 109 sent from the media houses or content providers with users/experts who can undertake the assignments 109. The co-creation platform 101 can also organize ad hoc working groups to complete the assignments 109. In addition, the co-creation platform 101 establishes expert networks and expert groups 111. Each of the expert group 111 may be a community of experts in different areas of competencies and the group 111 may be matched to undertake an assignment. The co-creation platform 101 provides rewards 113 as well as a mechanism to reward the users according to their contribution to the assignments. The co-creation platform 101 enables generation of co-creative media contents, and provides a way to create and activate different communities and social media groups. The matches of assignments with users are based on intelligent matching that utilizes data analysis and context information to link expertise tags with assignment tags.

Figure 2:
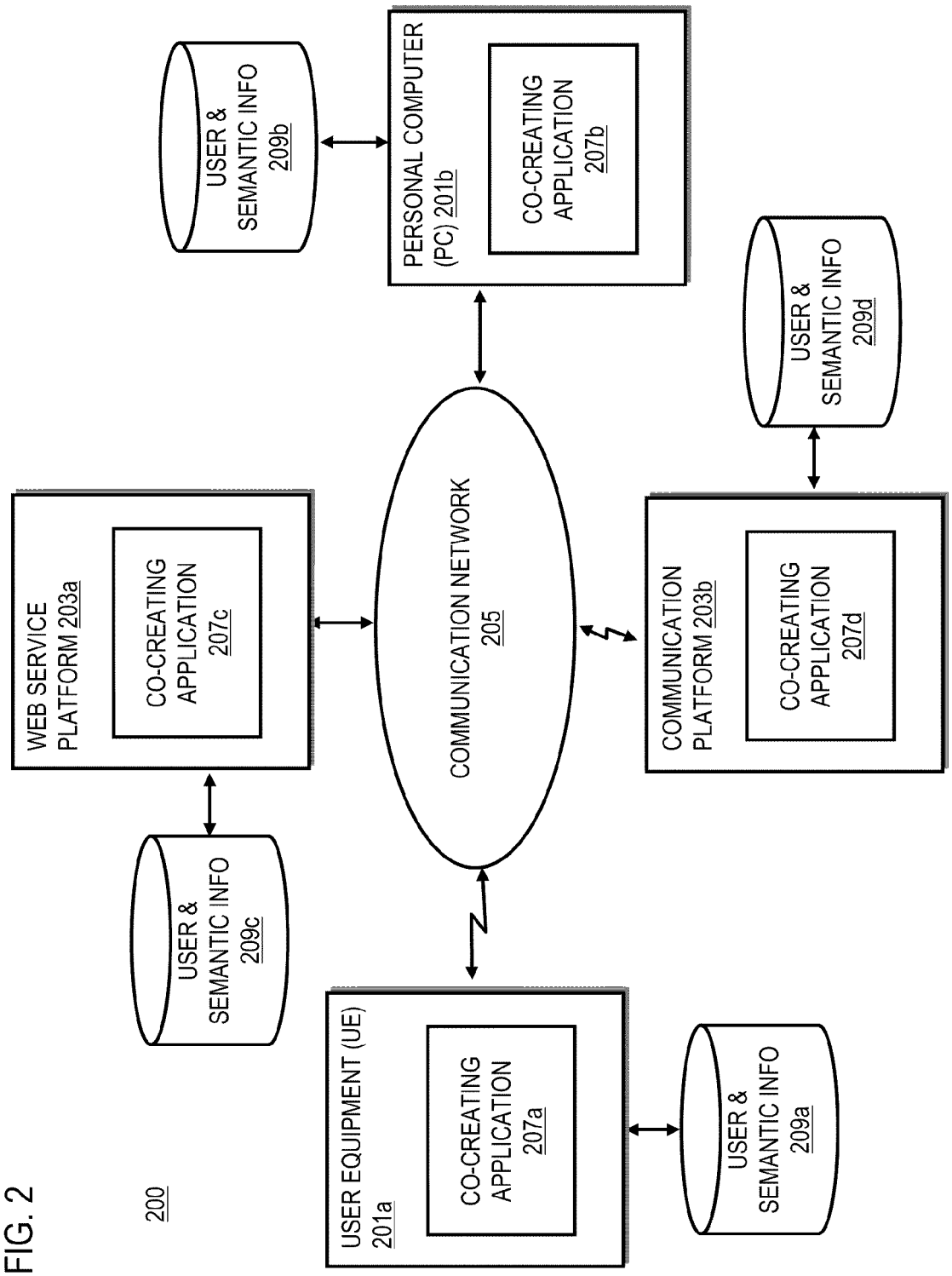
FIG. 2 is a diagram of a system capable of providing a co-creation platform, according to one embodiment.

FIG. 2 is a diagram of a system capable of providing a co-creation platform, according to one embodiment. The system 200 of FIG. 2 introduces the capability to provide a co-creation platform. As shown in FIG. 1, the system 200 comprises a user equipment (UE) 201a connected to a personal computer 201b, a web service platform 203a, and a communication platform 203b via a communication network 205. Each of the UE 201a, the personal computer 201b, the web service platform 203a and the communication platform 203b has a co-creation application 207 and a database 209 for storing user and semantic information.

By way of example, the communication network 205 of the system 200 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 201a is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 201a can support any type of interface to the user (such as "wearable" circuitry, etc.).

By way of example, the UE 201a, the personal computer 201b, the web service platform 203a and the communication platform 203b communicate with each other and other components of the communication network 205 using well known, new or still developing protocols. In this context, a protocol includes a set of rules defining how the network nodes within the communication network 205 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 3:
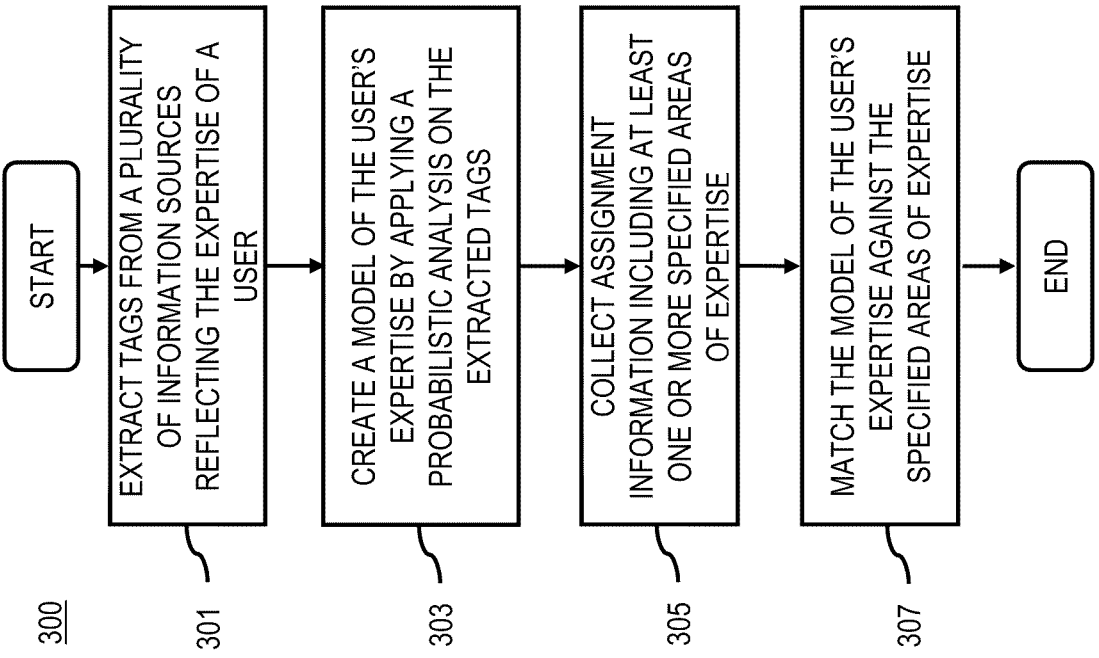
FIG. 3 is a flowchart of a process for providing a co-creation platform, according to one embodiment.
Figure 13:
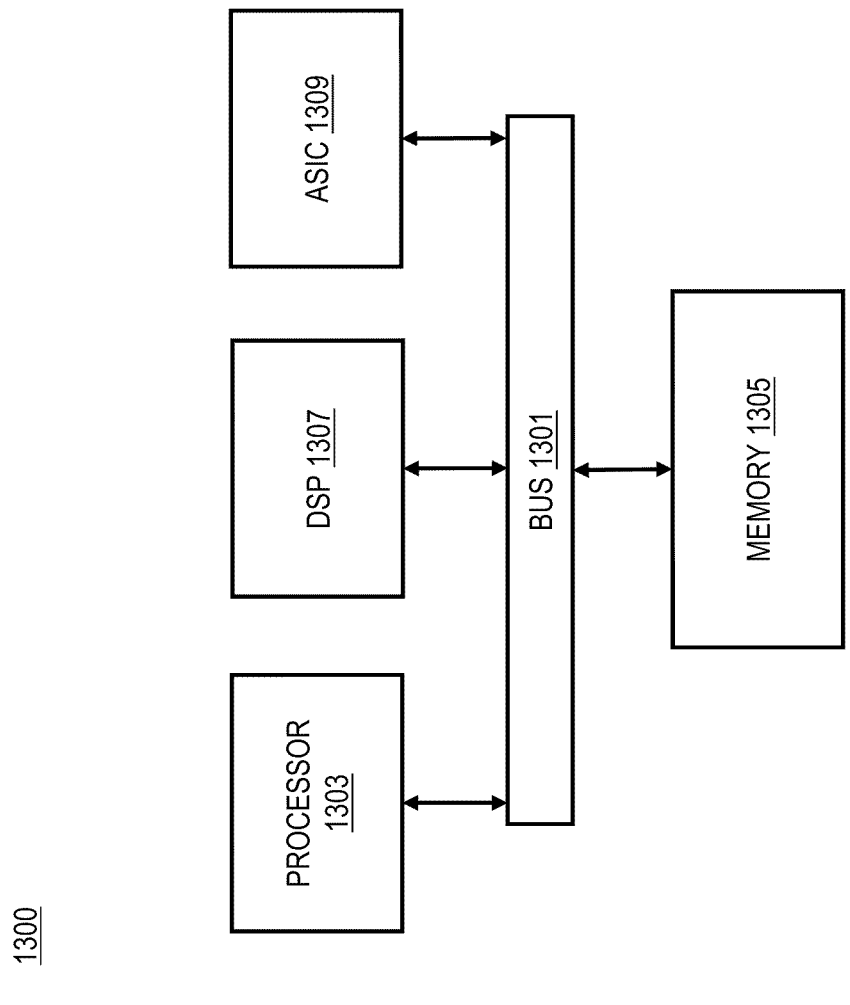
FIG. 13 is a diagram of a chip set that can be used to implement an embodiment of the invention.

FIG. 3 is a flowchart of a process 300 for providing the co-creation platform 101, according to one embodiment. In one embodiment, the system 200 performs the process 300 and is implemented in, for instance, a chip set including a processor and a memory as shown in FIG. 13. In step 301, the system 200 extracts tags from a plurality of information sources reflecting the expertise of a user. For example, an expert is a person with extensive knowledge or ability based on research, experience, or occupation and in a particular area of study. Expertise consists of those characteristics, skills, knowledge, and know-how of a person (that is not necessarily expert) or of a system, which distinguish a person with expertise from a person without the expertise. In many domains, there are objective measures of performance capable of distinguishing a person with expertise from those without it. For example, chess players with expertise are more likely to win games against chess players without expertise. Medical specialists with expertise at a special disease are more likely to diagnose the disease correctly than general medical practitioners.

The system 200 creates a model of the user's expertise by applying a probabilistic analysis on the extracted tags (Step 303). The details of creating this model are discussed in connection with FIG. 4. The system 200 collects assignment information including at least one or more specified areas of expertise (Step 305). An assignment can be any specific piece of work required to be done as a duty or for a specific fee. The system 200 may conduct an assignment analysis to figure out how the assignment is to be accomplished, including a detailed description of both manual and mental activities, tasks and element durations, task frequency, task allocation, task complexity, environmental conditions, necessary/optional clothing and equipment, and any other unique factors involved in or required for one or more people to perform the given assignment. The system 200 matches the model of the user's expertise against the specified areas of expertise (Step 307). Therefore, the system 200 enables building innovative approaches to link people with tasks, and enables creation of collaboration networks. The co-creation platform 101 enabled by the system 200 can be utilized in different use cases for variety of purposes as later described in detail.

Figure 4:
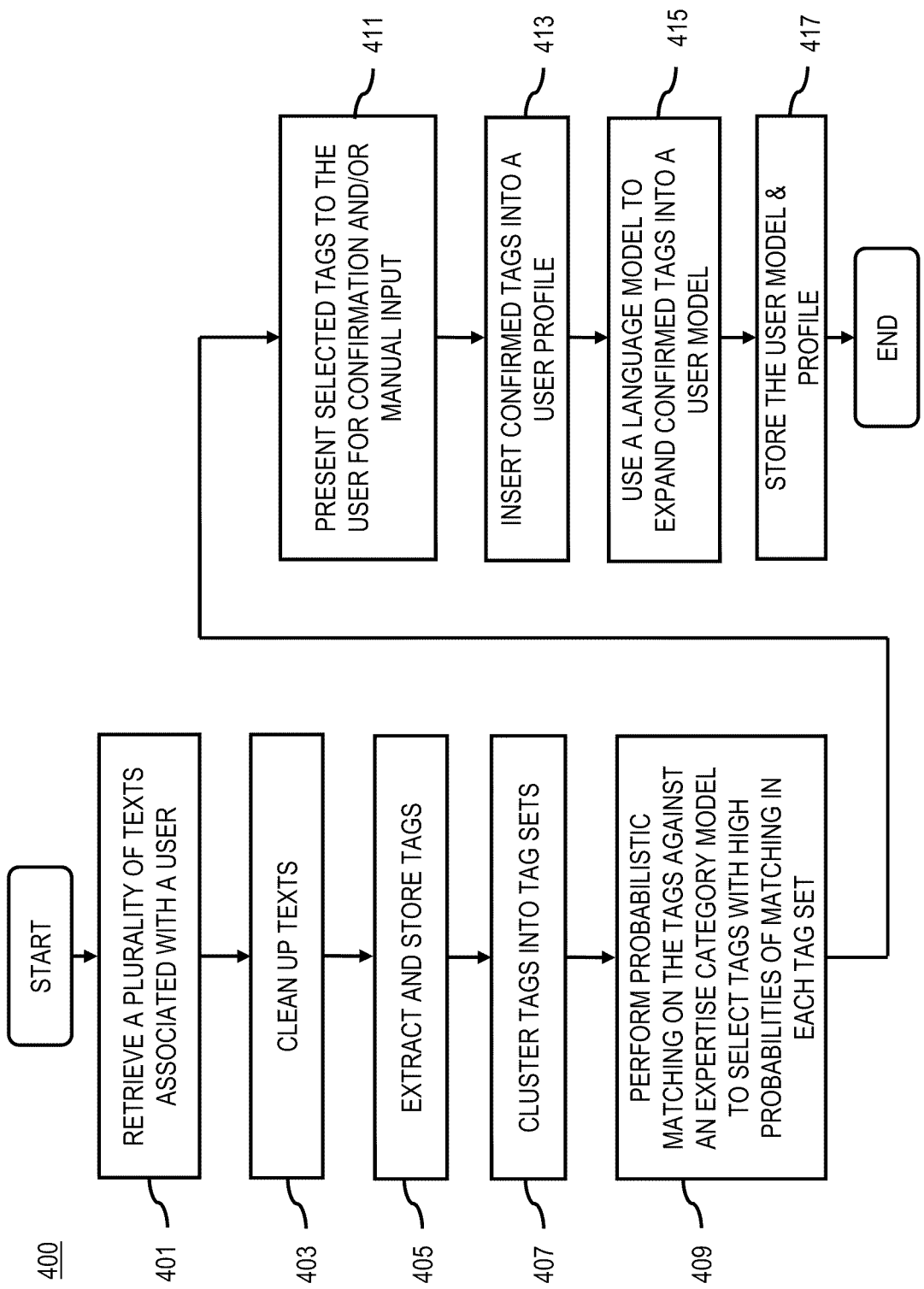
FIG. 4 is a flowchart of a process for creating a user model, according one embodiment.

FIG. 4 is a flowchart of a process 400 for creating a user model (i.e., a user expertise model), according to one embodiment. In one embodiment, the co-creation application 207 performs the process 400 and is implemented in, for instance, a chip set including a processor and a memory as shown FIG. 13. In step 401, the co-creation application 207 retrieves a plurality of texts associated with a user from different information sources. Users may disclose their knowledge base, interests via all kind of information sources, thus leading to participating in undertaking assignments.

By way of example, the user expertise information is collected at least from the user's knowledge base and interest which may be perceived from the user's web interactions. For example, the user history of visited web pages and URL bookmarks are collected via an extension to browser or a standalone implementation. Browsing by a user via Internet a resource that is related to the point of interest (e.g., the UNESCO website, the UNESCO World Centre website, the UNESCO World Heritage site websites) and connecting user's expertise to the assignment of producing photos of the UNESCO World Heritage sites in danger.

To simplify the discussion, the URLs are used for continuing discussion. However, it will be understood that other information sources can also be included in building the user's expertise model. Various exemplary embodiments may further include additional information sources such as (1) viewing by the user webcams transmitting video from inside the eight hundred ninety UNESCO World Heritage sites locates in one hundred forty eight states, (2) mentioning the Heritage sites by the user in the user's calendar appointments, (3) calling by the user at an establishment near the Heritage sites, (4) voting by the user the Heritage sites or an establishment near the Heritage sites as important or culturally or physically significant, (5) media items (articles, music, video, photos, etc. posted in blogs on web pages, etc.) created by the user regarding the Heritage sites, (6) articles, music, video, photos, etc. captured by the user regarding the Heritage sites, etc.

Each of the URLs is crawled and parsed to obtain text. The texts are retrieved via URL bookmarks (e.g., 120 URLs) of the user. The text may be embedded in a document (e.g., a word processing or presentation document) user installed application on the device, updates to software done by the user, associated devices and their textual content etc. Many texts are readily available online and widely accessed by diverse communities and users. For example, scholarly articles are increasingly published in electronic form, and historical archives are being scanned and made accessible. Since the data are largely unstructured and comprise tens of thousands of words, automated topic modeling is essential for locating expertise tags, knowledge base, and interest of the users. Topic models, such as Latent Dirichlet Allocation (LDA), are useful tools for the statistical analysis of document collections. Topic models are established based upon the idea that documents are mixtures of topics, where a topic is a probability distribution over words. With respect to the approach described herein, the topics that are modeled related to, for instance, a user's expertise or skill.

The co-creation application 207 then cleans up texts (Step 403), for example, by removing all metadata tags, whitespaces, images and other unwanted parts in each text. After the cleanup operation, only words are left in the texts. Once the clean text is obtained, the co-creation application 207 extracts tags by deploying a part-of-speech tagging (POTS) to mark up nouns in the cleaned-up text. POTS is a process of marking up nouns in a text (corpus) as corresponding to a particular part of speech, based on both its definition, as well as its context. Part-of-speech tagging is more than just having a list of words and their parts of speech, because some words can represent more than one part of speech at different times. For example, "dogs" is usually a plural noun, but can be a verb. The co-creation application 207 then extracts nouns using a language dictionary, and stores the nouns/tags in the database 209 (Step 405). The nouns/tags are later input to a clustering algorithm.

The co-creation application 207 then clusters the tags into a plurality of tag sets based a correlation among tags within each of the tag sets (Step 407) in order to more easily relate them to specific areas or combinations of expertise. The number of sets (e.g., 10) that the co-creation application 207 clusters the tags is pre-defined or determined automatically by the co-creation application 207. By way of example, the tags are clustered based on their by determining correlation among the tags through LDA, probabilistic latent semantic analysis (PLSA), or other clustering algorithms.

For example, LDA is generative probabilistic model as well as a "bag of words" model. In other words, the words of the documents are assumed to be exchangeable within them. The LDA model assumes that the words of each document arise from a mixture of topics, each of which is a probability distribution over the vocabulary. As a consequence, LDA represents documents as vectors of word counts in a very high dimensional space, while ignoring the order in which the words appear. While it is important to retain the exact sequence of words for reading comprehension, the linguistically simplistic exchangeability assumption is essential to efficient algorithms for automatically eliciting the broad semantic themes in a collection of words.

As another modeling algorithm, PLSA is a statistical technique for analyzing two-mode and co-occurrence data. PLSA was evolved from latent semantic analysis, and added a sounder probabilistic model. PLSA has applications in information retrieval and filtering, natural language processing, machine learning from text, and related areas.

In other embodiments, tag selections are performed based on parts of speech tagging or through histogram filtering. The LDA or PLSA can be integrated before or after the speech tagging or histogram filtering. This provides flexibility to the co-creation platform 101.

Several iterations of the algorithm may be executed over the tags to get as refined a grouping of tags as wanted. Once the tags are clustered into tag sets, the co-creation application 207 determines one or more tags per tag set based upon a sub-language model pertaining to pre-defined interest categories or classes, by matching tags in each tag set against the sub-language model. An expertise category or class is a pre-defined vocabulary of a category or class. Each expertise category or class describes in broad terms what user expertise may be through a system specific vocabulary. By way of example, taxonomy of 60 expertise categories or classes has been defined to tone down a general dictionary (e.g., Wikipedia) or a language model (e.g., a model to associate different words based on word meaning, context, correlation, and the like) into the sub-language model (i.e., a subset of a language model that contains words related to the 60 expertise categories) into the sub-language model which constitutes a category model. By way of example, the general dictionary may be 1 GB in size, whereas the category model may be only 200 MB in size.

The one or more tags (e.g., 3), that are best associated with the category model using, for instance, a probabilistic matching determination against the category model, are selected to be presented to the user (Step 409). The taxonomy of expertise categories or classes can also be quite extensive and include many categories or classes that may not necessarily be related. More specifically, the taxonomy of expertise categories or classes contains predetermined expertise characteristics, skills, knowledge, and know-how. By way of example, the category model may include any number (e.g., 1,000) of categories or classes and may include at least one category tree of professions. The tree contains, for instance, categories such as lawyers, doctors, engineers, etc., as well as sub-categories such as electrical engineers, chemical engineers, etc.

For example, a category model associated with characteristics of a science journalist may include expertise categories such as technical writing, engineering degree, research skills, etc. In this way, the language model is reduced to a subset of words associated with the expertise categories to create the specific expertise category model that can be more easily matched by the tags. In another embodiment, the taxonomy of expertise categories or classes may be predefined by another party such as the media houses, professional societies, consensus standards bodies, and the like. Moreover, the category model may be stored at a server or client end depending on where the model is deployed to perform matches of against user expertise models.

FIG. 5 shows an example of matching probabilities among tags in a tag set, according to one embodiment. This example is calculated for a user who is a veterinarian. For example, Veterinary (0.03), Dog (0.02) and Cat (0.01) are the top three tags in one tag set. The calculated matching or correlation probabilities enable the co-creation application 207 to evaluate, for instance, the relative accuracy or appropriateness of the determined category model to the user's set of expertise.

The co-creation application 207 then presents the selected one or more (e.g., 3) tags that match the category model with the highest probabilities to the user for confirmation (Step 411). The user can then determine which of the presented tags best express the user's expertise. For example, the co-creation application 207 selects the top few tags with high probabilities of matching in each of the 10 tag sets into 30 tag candidates for the user to confirm as the user's expertise tags. The user can then determine if these tags correctly express the user's expertise.

In addition or alternatively, the user may manually specify one or more of the tags to represent the user's expertise. If none of the presented tags were confirmed by the user and the user does not wish to manually enter the tags, Steps 401-411 can be repeated for a different set of URL bookmarks or other information sources. Once the tags are confirmed or specified by the user, the co-creation platform 207 inserts the tags into a user profile corresponding to the user (Step 413). The user profile can then be used to map to a first level expertise class in a later process depicted in FIG. 6. As an example, the tags such as familiarity with animal pharmacology, aboriginal culture, and doctor visits may be expertise tags of a veterinarian, and these tags may match the veterinarian to undertake the assignment of taking a documentary film regarding animal abuse in a developing country.

The co-creation application 207 next applies probabilistic analysis using, for instance, a language model to the confirmed tags to obtain a user model for the user (Step 415). In other words, the language model may be used to extrapolate a more expansive list of tags or expertise categories to include in the user's expertise model. In this way, the co-creation platform 101 advantageously reduces the amount of input from the user for creating a user expertise model, thereby decreasing the burden on the user. For example, the user confirms expertise tags related to still photography, wild animals, mountain climbing, and kayaking. The co-creation platform 207 can then apply the language model to determine other related categories to create a more comprehensive user expertise model. For example, the language model fills in the user model to describe a field photojournalist capable of extended assignments in remote locations under rugged conditions. The user model thus includes the confirmed tags as well as related categories as determined by the language model. In one embodiment, each of the tags (e.g., determined by the language model) has a correlation metric associated with the tag that shows how correlated that tag is with the category model. So, from the initial set of confirmed tags, the user model may be expanded to contain, e.g., a significantly larger set of tags (e.g., 100 or more tags).

The user model is thus established based upon user knowledge base and interests, as well as user interaction history. The co-creation application 207 stores the user model in the database 209 (Step 417). A user model thus contains a subset of tags and/or categories from a global set of expertise categories against which the user's skills are mapped.

In one embodiment, the user model can also be used for secondary fine grained filtering in a later process depicted in FIG. 6. As described later, the media houses or content providers may choose from a set of these categories that describe the expertise they expect from user candidates. For example, the chosen categories may then be used to derive assignment tags against which the user expertise models may be applied.

The above-described embodiments automatically create expertise tags for the user (by examining user browsing history, knowledge base, experience, interest, etc), and suggest the expertise tags to the user. Therefore, topics or areas of expertise that the user may otherwise forget are presented to the user to be selected and input in the user's profile. In addition, the above-described embodiments may also provide cues to the user as to what topics are suitable for the user to attract matching assignments from the media houses or content providers.

Figure 6:
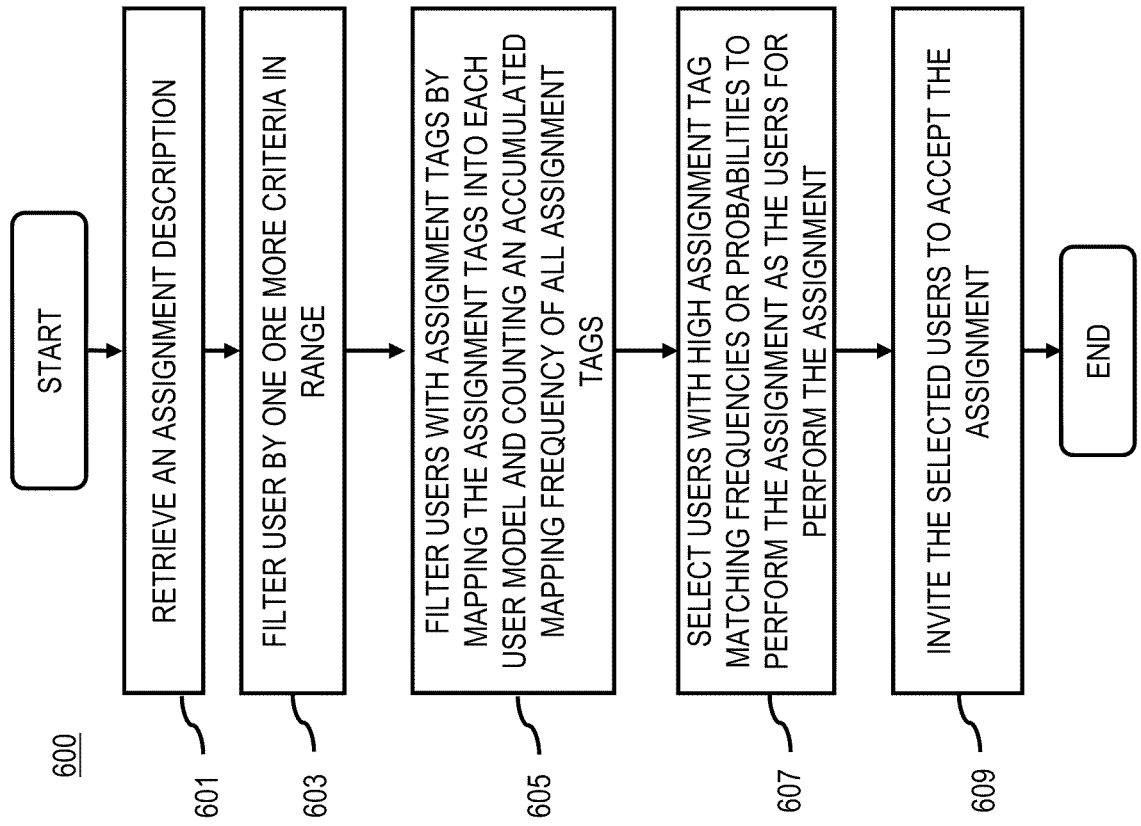
FIG. 6 is a flowchart of a process for selecting users for an assignment, according to one embodiment.

FIG. 6 is a flowchart of a process 600 for selecting users for an assignment, according to one embodiment. In one embodiment, the co-creation application 207 performs the process 600 and is implemented in, for instance, a chip set including a processor and a memory as shown FIG. 13. In step 601, the co-creation application 207 retrieves an assignment description, which may be provided by the media houses or content providers and which include at least an assignment location and tags (e.g., categories of expertise) required for the assignment. Optionally, the co-creation application 207 creates assignment descriptions for the media houses or the content providers, by introducing business domain specific attributes and fields therein. The co-creation platform 101 enables flexible metadata sets that can be used to set different attributes. A media house, user, or user group can provide its own metadata sets for assignment descriptions to the co-creation platform 101.

An assignment description defines tasks with specific requirements, such as locations, content requirements (e.g., free-text, tags, multimedia, etc.), time, place, needed competencies etc. With respect to the initial example provided above, the co-creation application 207 can break down the assignment of taking photos of eight of the UNESCO World Heritage sites in danger into eight tasks or sub-assignments to be fulfilled by eight sets of users.

The co-creation application 207 then filters users by one or more criteria in range (such as an assignment/task area covering an assignment/task location) in Step 603. The co-creation application 207 further filters the users with assignment/task tags, by mapping the assignment tags created for the assignment with the user models created in Step 415 and counting an accumulated mapping frequency of the assignment tags for each of a plurality of the users (Step 605). It is noted that when making the assignment inputs, tags are entered into the assignment description by the media houses of content providers. It is contemplated that there can be no limit to what the assignments can require. When matching the assignment against user expertise, the co-creation application 207 receives multiple user models. Each user model is matched against the assignment/task tags.

The co-creation application 207 finds users with high assignment tag matching frequencies or probabilities to perform the assignment as the candidates for the assignment. In particular, the co-creation application 207 selects, for instance, the top few users with high assignment/tasks tag matching frequencies or probabilities as users to perform the assignment/tasks (Step 607). Any entered assignments will be fully addressed. If there are any materials (such as additional pictures, videos, etc.) that a user is not able to provide, these materials will be sourced to someone else.

The co-creation application 207 invites the user candidates to accept the assignment/tasks (Step 609). The users can decide whether to take the assignment/tasks. For instance, with respect to the initial example described above, once the users accept the assignment/tasks, the co-creation application 207 sends details of the eight tasks to eight groups of users who will perform the tasks with their expertise, resources, and equipment (including the UE 201a, and the PC 201b, etc.). In this embodiment, tasks are sent to the best matching candidates based on individual profiles. In another embodiment depicted in FIG. 7, the tasks are assigned to predefined groups of users based upon criteria information.

Figure 7:
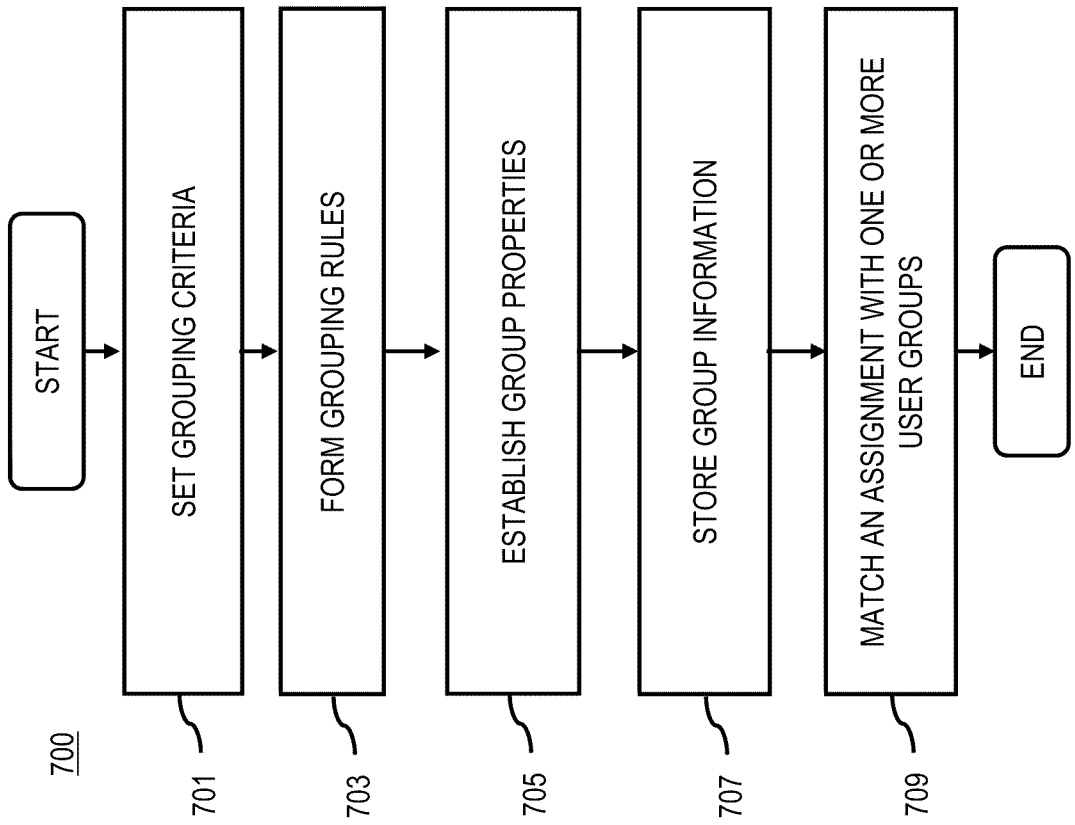
FIG. 7 is a flowchart of a process for creating user groups, according to one embodiment.

FIG. 7 is a flowchart of a process 700 for creating user groups, according to one embodiment. In one embodiment, the co-creation application 207 performs the process 700 and is implemented in, for instance, a chip set including a processor and a memory as shown FIG. 13. By creating and maintaining user groups and their associated metrics, search for users that satisfy different criteria is reduced from searching against individual user models to computing correlation to groups. Since the number of groups is much smaller than the numbers of users, the matching computation load is significantly reduced. It is noted that when the media houses or content providers create an assignment, the co-creation application 207 automatically detects groups of people (rather than individuals) needed to fulfill the assignment or tasks of the assignment. The process 700 proceeds with an approach of Criteria→Rule→Grouper Function (Rule, user list) →Groups as described as follows.

In step 701, the co-creation application 207 sets grouping criteria (e.g., for an assignment). A grouping criterion is a piece of information that describes the parameters (e.g., age, sex, interest areas, etc.) crucial for the assignment and used in the matching process. For example, user's location constitutes a grouping criterion for the assignment of taking photos of eight UNESCO World Heritage sites in danger. As another example, user's mountaineering experience constitutes a grouping criterion for an assignment of taking photos of Mt. Everest. Some criteria can also be given in a form of an open document.

The co-creation application 207 forms one grouping rule for one assignment (Step 703). The purpose of the rules is to combine the criteria of an assignment into a single rule that forms a basis for the group creation process. A rule is a set of instructions that can be interpreted by the co-creation application 207 and can be executed over the database 209 and the user models. The database 209 contains user defined tags and automatically generated tags (from user interaction history, assignment creation process, rewards etc). The database 209 also contains user location information, etc. that describe current user situations and user expertise that are used for the first level filtering Step 603. As described, the user models are medium-scale language matrix models that are generated from the language model and used in the secondary filtering Step 605.

Rules are either automatically generated by the co-creation application 207 or provided explicitly to the co-creation application 207 from one or more external sources. Similar to the process 600, the media houses or the content providers can provide the assignment tags, metadata about each assignment, and assignment description to generate rule sets. The media houses or the content providers can specify whether the assignment can be serviced by a single user or multiple users. It is noted that when multiple users are allowed, the criterion set is used to build a virtual group that has a high probability score to service that assignment. The media houses or the content providers can provide rules uploaded directly to the co-creation application 207 or provide the rules through social networks to create virtual groups. In the externally given rules, more accurate parameters can be provided for maintenance of the group than those generated automatically by the co-creation application 207.

The co-creation application 207 also establishes group properties and groups (Step 705). Each group has a set of fixed properties as well as a set of floating properties. The groups maintain a dynamic index of user IDs that are subject to rule verifications within stipulated intervals. A user entry within the group has properties other than the user ID. The groups are virtual, and there may be not-pre-defined groups. In addition, there may be exclusive membership to a group. Groups are made and kept at least in the database 209. Users are added, maintained or removed from groups based on whether they satisfy the grouping criterion. A set of properties that are required for each group may include:

Tags: a set of tags can determine the grouping criterion
Rules: any additional rules that are to be followed in addition to the grouping criterion
Temporal constraints: how long is the group to be maintained and what is the refresh rate for checking the rules
Spatial constraints: location information concerning membership to the group and any spatial rule sets to be followed (e.g., whether the group is mobile)
User IDs and associated user probability metric
Range and threshold: a range or a minimum threshold for allowing users enroll into the group Basically, the group creation process 700 is performed by one single function that takes in the rule, and potential users are grouped into a desired kind of group as described by the rule. The user list can be replaced by a group list to create a group of groups. The co-creation application 207 then automatically outputs a list of groups that fulfill the criteria for the group creation process.

Each group is anchored around a central property. The property (or sets of properties) determines the central point of a group. The properties can be a single or set of tags, location information or event. The co-creation application 207 executes the rule sets over a user database and/or user models, and finds a set of users with differing probability metric to the central property (and other properties), to result in a set of concentric circles where the user position is determined by a distance from the central metric. A group can be configured to host any number of circles, and users are mapped to each of those circles. The particular circle to which the user belongs to is computed by building a joint metric containing a probability score of the user tags (from the user model) with respect to the central set of tags. The particular position of the user within a circle is determined by other tag sets that are within the rule sets for the group that has certain correlation with the user model. The user can thus belong to multiple groups with specific properties, while the concentric circles can intersect. This results in a high-end indexing that is efficient both in terms of processing speed and memory, while opening potential application fronts that are not possible with the conventional approaches.

It is noted that when a set of tags is provided, all the co-creation application 207 needs is to find one or more groups with some correlation to those tags so as to determine whether the user groups will be found in that vicinity. Finding the right group of users becomes a mathematical process of computing the intersection spaces between two or more user groups with the highest correlation score to that tag set. This enables the media houses or content providers to quickly see groups of potential users by simply varying tag sets when creating and matching assignment.

The co-creation application 207 stores group information in database 209 (Step 707). Once the groups are stored, they can be accessed and used by any application linking to the co-creation platform. The group formation process 700 can also be integrated with other processes.

The co-creation application 207 then matches an assignment with one or more user groups (Step 709). The process 700 further improves the system 100 by enabling automatic grouping of users to jointly accept assignments and tasks. The above-described embodiments provide a highly accurate match probability and greater control over selection of users into user groups for different assignments, by providing an automated way of assigning multiple people to jointly fulfill one assignment. Through creating and maintaining user groups and their associated metrics, searches for users that satisfy criteria (other than those of the group) is reduced from searching individual user models to computing correlation to user groups. Since the number of groups is much smaller than the individuals, the above-described embodiments accelerate computation and reduce response time several-fold, and further reduce demand on system resources.

Figure 8:
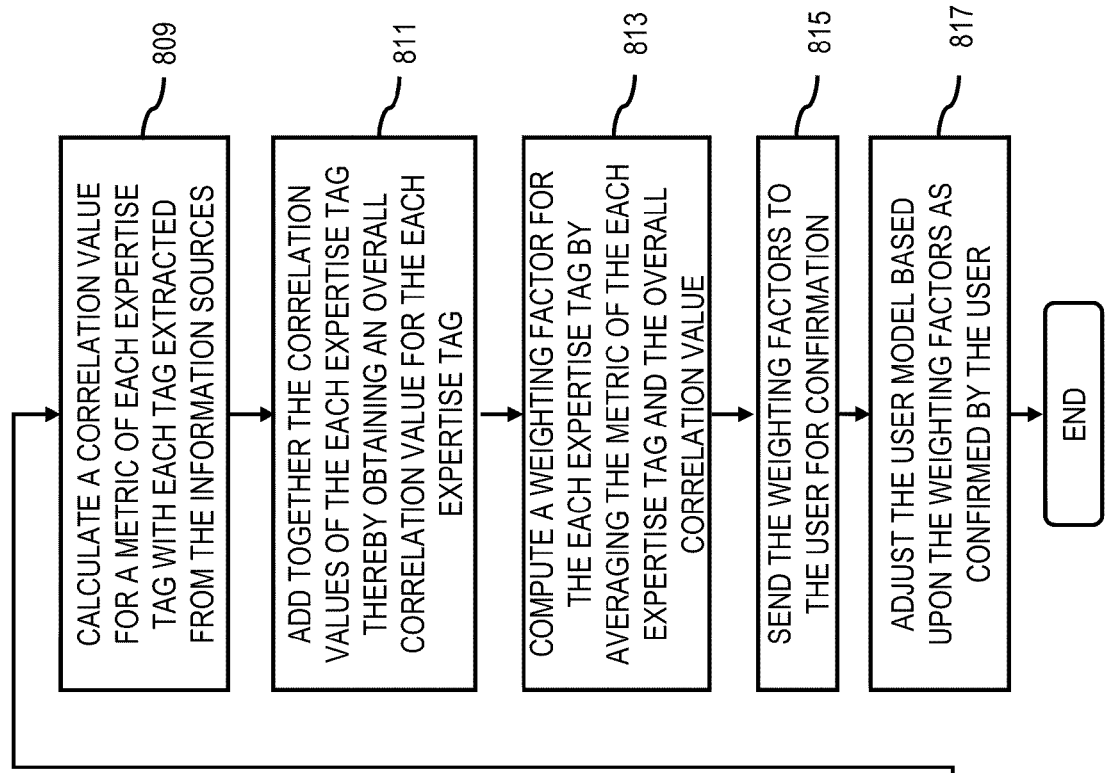
FIG. 8 is a flowchart of a process for a user to insert a weighting factor for each tag, according to one embodiment.
Figure 8:
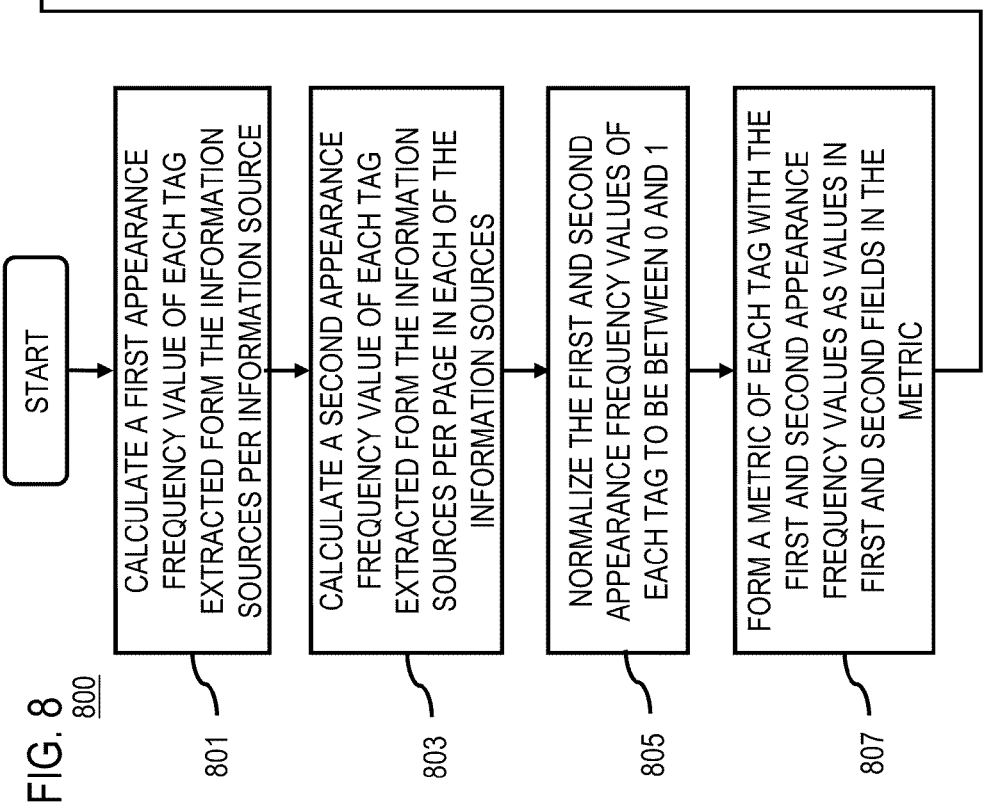

FIG. 8 is a flowchart of a process 800 for a user to insert an intended weighting factor for each tag, according to one embodiment. In one embodiment, the co-creation application 207 performs the process 800 and is implemented in, for instance, a chip set including a processor and a memory as shown FIG. 13. In this embodiment, the co-creation application 207 makes a 1*2 matrix for each tag extracted from the 120 URLs, i.e., from the user web browsing history and bookmarks. The first field in the matrix corresponds to a first appearance frequency value which gives a total frequency of each tag for the whole parsed text which is ultimately used to construct a histogram of all tags encountered. In step 801, the co-creation application 207 calculates the first appearance frequency value of each tag extracted from the information sources per information source. In addition, rather than using a language dictionary (Step 405 of the process 400), the co-creation application 207 applies a filter to the histogram to remove common-tags and only take the rest of tags conforming to the "noun" part of text.

The second field in the matrix corresponds to a second appearance frequency value of each tag which is more relevant to topics, since the second field gives a normalized value depicting the importance and frequency of each tag for only those texts/pages it is associated with. The value is based on how many texts/pages that tag occurs in, i.e., the frequency of the tag for each text/page it occurs in. The value may be normalized to a range, such as between 0 and 1. The second field in the matrix indicates the importance of that tag and its occurrence on any semantically tagged content (such as HTML h1, h2, h3 heading tags). In an HTML document, HTML elements are tags, as well as text, which act as indicators to a web browser as to how the document is to be interpreted by the browser and ultimately presented on the user's computer screen. The co-creation application 207 also calculates the second appearance frequency value of each tag extracted from the information sources per page in each of the information sources (Step 803).

The co-creation application 207 may normalize the first and second appearance frequency values of each tag, e.g., to be between 0 and 1 (Step 805), and forms a metric of each tag with the first and second appearance frequency values as values in first and second fields in the metric (Step 807).

After the final sets of tags has been automatically selected and the confirmed by the user as the expertise tags (e.g., Step 417 of the process 400), the co-creation application 207 calculates a correlation value for a metric of each expertise tag (e.g., expertise categories included in the user's expertise model) with each tag extracted from the information sources (Step 809). The values in the matrix for the expertise tags are thus further refined by executing the correlation process with the rest of the tags that were and were not chosen through a matching process with the language model.

The co-creation application 207 adds together the correlation values of the each expertise tag thereby obtaining an overall correlation value for the each expertise tag (Step 811). The overall correlation value indicates how much this tag matches with other tags extracted from the information sources.

The co-creation application 207 computes a weighting factor for the each expertise tag by averaging the metric of the each expertise tag and the overall correlation value (Step 813). The weighting value of each confirmed topic may be set as a value between 0 ("novice") and 1 ("expert"). The co-creation application 207 sends the weighting factors to the user for confirmation (Step 815). The co-creation application 207 adjusts the model of the user's expertise based upon the weighting factors as confirmed by the user (Step 817). The weighting values as confirmed by the user are then stored in the database 209 as a table, i.e., a user identified expertise and weighting table. Thereafter, the later filtering process similar to the process 600 can take into account the weighting factor associated with each tag.

Figure 9:
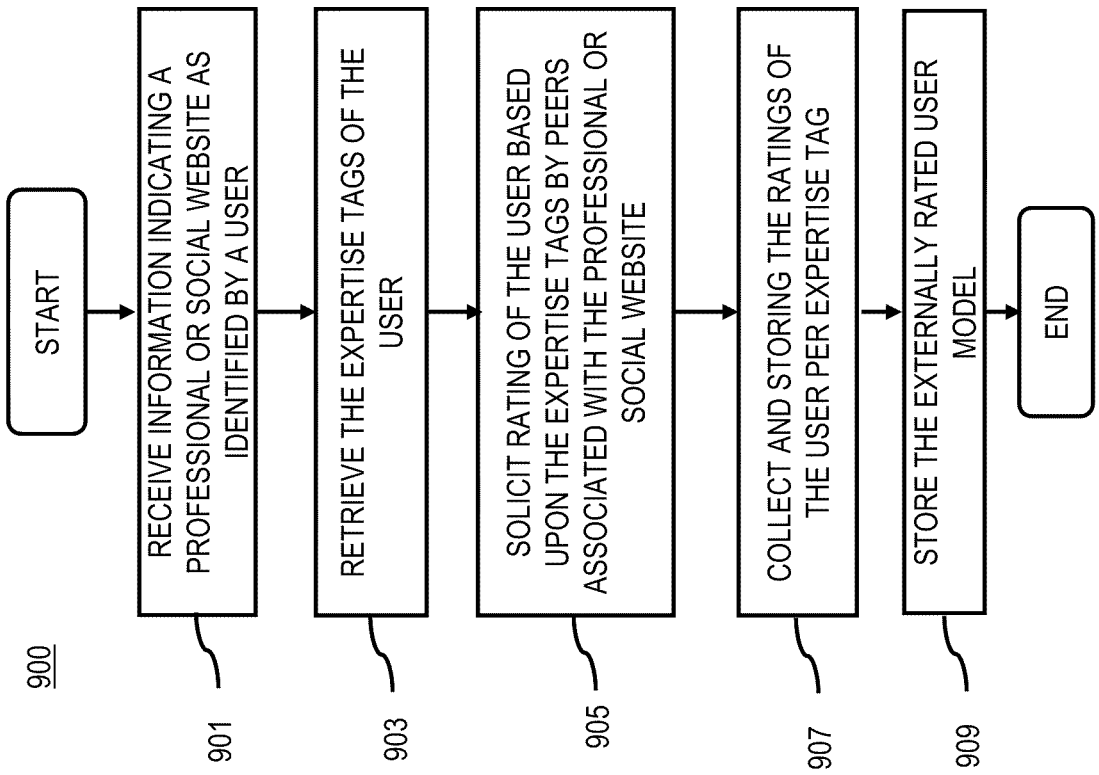
FIG. 9 is a flowchart of a process for a user to insert an external rating for each tag, according to one embodiment.

FIG. 9 is a flowchart of a process 900 for a user to insert an external rating for each tag, according to one embodiment. In one embodiment, the co-creation application 207 performs the process 900 and is implemented in, for instance, a chip set including a processor and a memory as shown FIG. 13. The user has the option to add his/her username with external social networking sites to the co-creation platform to introduce external ratings on the expertise tags. The co-creation application 207, once receiving the tags, maps each tag against a particular category such as scientific, biological, animal, etc. In addition or alternatively, the categories may be retrieved from the user's profile. This information is then used for peer ratings within professional (e.g., IEEE) or social networking sites, or other services.

In step 901, the co-creation application 207 receives information indicating a professional or social website as indentified by a user. The co-creation application 207 retrieves the expertise tags of the user (Step 903). The user groups within the websites related to that particular category is identified for soliciting ratings. If the user is a member of this group, a special rating is applied in addition to ratings for user expertise from fellow peers. In addition, any articles or publications by the user are used for ratings.

The co-creation application 207 solicits rating of the user based upon the expertise tags (e.g., expertise categories) by peers associated with the professional or social website (Step 905). The co-creation application 207 collects and stores the ratings of the user per expertise tag (Step 907). The external ratings are stored in an external rating table pertaining to the user in the database 209. The co-creation application 207 adjusts the model of the user's expertise based upon the ratings (Step 909).

In another embodiment, the co-creation application 207 updates external ratings after new articles/publications or new assignments finished by user. This updating is an ongoing process, and every time an assignment related to the topic is serviced by the user and accepted by the media houses or the content providers, the rating is again updated. A degree of assignment acceptance by accepted by the media houses or the content provides is used as one kind of external ratings as well. It is optional for the user to provide external ratings to the co-creation platform. The media houses or content providers can reward the users who provide external ratings with additional assignment payments or higher opportunities to get assignments.

In other embodiments, the media houses or content providers are invited to adjust an external rating for each tag by moving a slider for each tag between novices to expert. The default is mid-way. Thereafter, the later filtering process similar to the process 600 can take into account the external rating associated with each tag.

After a set of users has been identified in the process 600, the metric (e.g., that falls between 0 and 1) for user self-weighting or external rating is increased by 1 and multiplied to all tags that are self-weighted or externally rated. Thus two sets of tags with weighting factors or external ratings are formed. To match users with an assignment, the media houses or the content providers can use just the weighting factors obtained from the process 800, or just the external ratings obtained from the process 900, or a combination thereof. The weighting factors and the external ratings can be combined by indicating a matrix that falls between the user-self weightings obtained from the process 800 and the external-ratings obtained from the process 900. The combination matrix is then used to compute suitability of each user for the assignment. The described embodiments according to the processes 800 and 900 apply the weighting factors and the external rating. On the other hand, the process 600 does not consider the weighting factors and the external at all.

The correlation match of each tag within the user model to the set of identified tags sets is computed similarly as the Steps 605-607 based upon the weighted user model (obtained from the process 800), or the externally weighted user model (obtained from the process 900), or a combination user model (obtained from the combination matrix). A single probability metric is then computed that gives a match to the assignment tags. This probability metric may be then multiplied by additional weighting factors provided by the media houses or the contend providers. For each user, a total probability is computed for each assignment tag. A final selection is then made on users having the highest total probability computed for all assignment tags as in step 607 of the process 600.

The above-described embodiments provide a highly accurate match probability and greater control over selection of users within the co-creation platform, by accounting for external source ratings and user-self weighting which offer more control to the media houses or content providers in selecting suitable users for assignments. The above-described embodiments also reward users for putting in external ratings and thus provide a more accurate picture of the user expertise.

Figure 10:
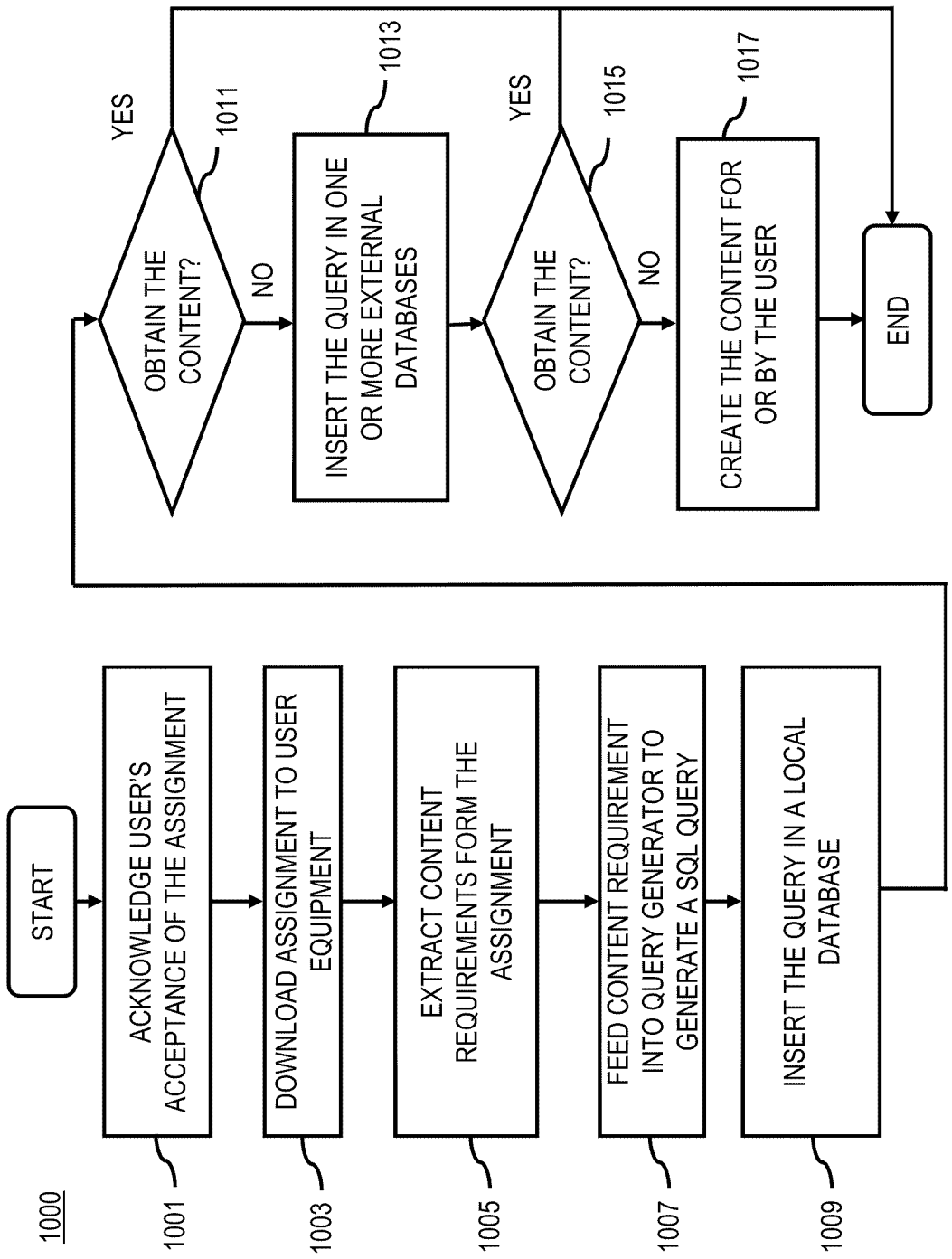
FIG. 10 is a flowchart of a process for a user to query for information or media content, according to one embodiment.

FIG. 10 is a flowchart of a process 1000 for a user to query for information or media content, according to one embodiment. The process 1000 comes into play once the user has been selected, the assignment downloaded to the user device, and the user has accepted the assignment. In one embodiment, the co-creation application 207 performs the process 1000 and is implemented in, for instance, a chip set including a processor and a memory as shown FIG. 13. In step 1001, the co-creation application 207 acknowledges the user acceptance of the assignment.

The co-creation application 207 downloads the assignment information to the user equipment 201a (Step 1003). The assignment can be structured as a pre-defined template by the media houses or content providers. The assignment information includes textual description of the assignment, required media files and types, information such as an assignment location, time etc., and desired profiles of users (in forms of assignment tags). The user profile portion of the assignment information is used by the co-creation application 207 to identify users based on their profiles as discussed above. The rest of the assignment information is transferred to the UE 201a.

The co-creation application 207 at the UE 201a extracts content requirements, assignment location, time etc. from the assignment information (Step 1005). The type and number of content required in the assignment can be, for example, three still photos of the Helsinki Hartwall Arena with resolution no less than 240*480.

The co-creation application 207 feeds the content requirements into a query generator to generate a query based upon the assignment parameters for the user (Step 1007). This can be done by filling up a pre-defined query form using assignment parameters. By way of example, the co-creation application 207 deploys a resource description framework (RDF) engine as the query generator for servicing RDF queries. The RDF engine can process queries in any RDF query languages, such as SPARQL Protocol and RDF Query Language (SPARQL), WQL, DQL, N3QL, R-DEVICE, RDFQ, RDQ, RDQL, RQL/RVL, SeRQL, Versa, XUL, Adenine, etc.

The co-creation application 207 inserts the query in a local database (Step 1009). The RDF engine discovers any media file matching (or similar) to the assignment parameters that are already on the UE 201a by way of example, a local SQLite database is available in the case of web run time (common web runtime to process the query. If the local database returns with the required resource (Step 1011), the co-creation application 207 ends the process 1000. If the local database does not have the required resource (Step 1011), the co-creation application 207 inserts the query in one or more external databases (Step 1013).

If the external databases return with the required resource (Step 1015), the co-creation application 207 ends the process 1000. If the external databases do not have the required resource (Step 1011), the co-creation application 207 creates the content for the user or the user creates the content (Step 1017). If the query does not yield any results, the user can manually search and upload media. If no such media is available or such media may be available to share in the future, the user can subscribe to the RDF engine for future results.

In another embodiment, the co-creation application 207 synchronizes the local database with external database over the semantic web. In ad-hoc local connections or in wide area connections, the RDF query that is cached is presented to other RDF repositories to check if the query can be performed for results. This means that certain aspects of the assignment that the user cannot satisfy can be sourced intelligently and in automated manner through the semantic web. In addition, a remote repository manager can establish session and source media from other repositories. If satisfactory media is found, it is sent to the UE 201a for the user to review. The user can then decide whether to accept the results after examination. The rewards may be distributed between the user and the remote repository via a separate process. The co-creation platform 101 creates different incentives and rewards for users and content contributors for their shares of efforts. In addition, the users are able to see their contributing status summary based on their real activity and evaluations.

The above-described embodiments advantageously enable users to source contents that are not on their devices in an intelligent and automated manner, by using pre-defined assignment parameter templates as well as mapping the templates over RDF databases. Any media file that matches an assignment parameter query is automatically presented to the user. This reduces user interaction overload on the system 200 when servicing the queries.

Figure 11:
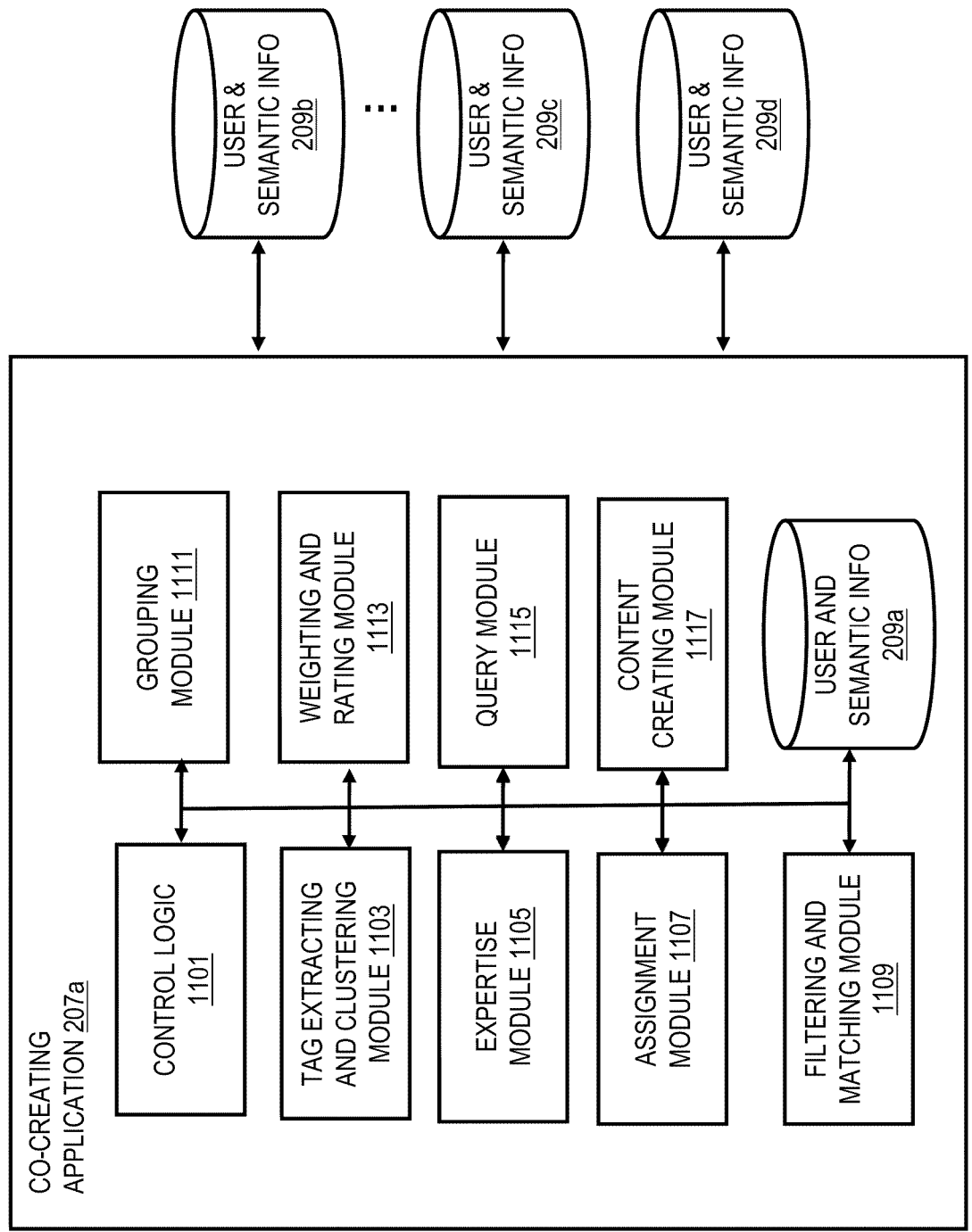
FIG. 11 is a diagram of the components of the co-creation application 207, according to one embodiment.

FIG. 11 is a diagram of the components of the co-creation application 207, according to one embodiment. By way of example, the co-creation application 207 includes one or more components for providing a co-creation platform. It is contemplated that the co-creation application 207 can resides on the UE 201a, the PC 201b, the web service platform 203a, the communication platform 203b, or any web platforms operated by or for the media houses or content providers. It is also contemplated that the functions of these components of the co-creation application 207 may be spread among different devices, equipments, or platforms. It is further contemplated that the functions of these components of the co-creation application 207 may be combined in one or more components or performed by other components of equivalent functionality. In this embodiment, the co-creation application 207 includes at least a control logic 1101 which executes at least one algorithm, stored in one or more memory modules, for performing co-creation functions of the query application.

The co-creation application 207 also includes a tag extracting and clustering module 1103 for performing the tag extracting and clustering Steps 401-407 of the processes depicted in FIG. 4. The tag extracting and clustering module 1103 retrieves a plurality of texts associated with a user from different information sources, cleans up texts, extracts and stores tags/nouns in the cleaned-up text, and inputs the tags to a clustering algorism. The tag extracting and clustering module 1103 clusters the tags into tag sets to find expertise tags.

The co-creation application 207 also includes an expertise module 1105 for performing the user expertise modeling Steps 409-417 of the process 400 depicted in FIG. 4. In the process 400, the expertise module 1105 performs probabilistic matching to determine one or more tags in each tag set. The expertise module 1105 selects top few tags with high probabilities in each of the tag sets into topic candidates for the user to confirm, and inserts topics confirmed by the user into a user profile of the user. The expertise module 1105 uses a language model to expand confirmed tags into a user model.

The co-creation application 207 also includes an assignment 1107 for performing the assignment processing Step 601 of the processes depicted in FIG. 6. Taking the process 600 depicted in FIG. 6 as an example, the assignment 1107 retrieves an assignment description, provided by the media houses or content providers. The co-creation application 207 also includes a filtering and matching module 1109 for performing the filtering and matching Step 603-607 of the process 600. The filtering and matching module 1109 filters users by one or more criteria in range (e.g., an assignment/task area). The filtering and matching module 1109 further filters the users with assignment/task tags by mapping the assignment tags created for the assignment. The filtering and matching module 1109 finds users based on high assignment tag matching frequencies or probabilities to perform the assignment. The filtering and matching module 1109 selects top few users with high assignment/tasks tag frequencies or probabilities to perform the assignment as users to perform the assignment/tasks.

The co-creation application 207 also includes a grouping module 1111 for performing the grouping Step 701-707 of the process 700 depicted in FIG. 7. The grouping module 1111 sets grouping criteria for an assignment, forms grouping rules, establishes group properties and groups, and stores group information the user and semantic information database 209.

The co-creation application 207 also includes a weighting and rating module 1113 for performing the weighting Steps 801-817 of the process 800 depicted in FIG. 8 and for performing the external rating Steps 901-909 of the process 900 depicted in FIG. 9.

It is noted that when performing the weighting function, the weighting and rating module 1113 calculates a first appearance frequency value of each tag extracted from the information sources per information source, and calculates a second appearance frequency value of each tag extracted from the information sources per page in each of the information sources. The weighting and rating module 1113 normalizes the first and second appearance frequency values of each tag (e.g., to be between 0 and 1), and forms a metric of each tag with the first and second appearance frequency values as values in first and second fields in the metric. The weighting and rating module 1113 calculates a correlation value for a metric of each expertise tag with each tag extracted from the information sources, and adds together the correlation values of the each expertise tag thereby obtaining an overall correlation value for the each expertise tag. The weighting and rating module 1113 computes a weighing factor for the each expertise tag by averaging the metric of the each expertise tag and the overall correlation value. The weighting and rating module 1113 sends the weighting factors to the user for confirmation, and adjusts the model of the user's expertise based upon the weighting factors as confirmed by the user.

It is noted that when performing the rating function, the weighting and rating module 1113 receives information indicating a professional or social website as indentified by a user, and retrieves the expertise tags of the user. The weighting and rating module 1113 then solicits rating of the user based upon the expertise tags by peers associated with the professional or social website, collects and storing the ratings of the user per expertise tag, and adjusts the model of the user's expertise based upon the ratings.

The co-creation application 207 also includes a query module 1115 for performing the querying Steps 1005-1015 of the process 1000 depicted in FIG. 10. The query module 1115 extracts content requirements assignment location, time etc. from the assignment information, and feeds content requirements into query generator to generate a query based upon the assignment parameters for the user. The query module 1115 inserts the query in a local database. If the local database returns with the required resource, the query module 1115 ends the process 1000. Otherwise, the query module 1115 inserts the query in one or more external databases. If the external databases return with the required resource, the query module 1115 ends the process 1000.

The co-creation application 207 also includes a content creating module 1117 for performing the content creating Step 1017 of the process 1000 depicted in FIG. 10. If the external databases do not have the required resource, the content creating module 1117 creates the content for the user or the user creates the content.

The above-described embodiments provide automated suggestions of expertise tags to the user by examining user browsing history, knowledge base, experience, interest, etc. This helps to extract topics that the user may otherwise forget to be considered and later inserted in the user profile.

The above-described embodiments provide a highly accurate match probability and greater control over selection of users into user groups for different assignments, by automatically grouping multiple people to jointly fulfill one assignment. Since the number of groups are much smaller than the numbers of individuals, this above-described embodiments accelerate computation and reduce response times.

The above-described embodiments account for external source ratings and user-self weighting to offer more control to the media houses or content providers in selecting suitable users for assignments. The above-described embodiments also reward users for putting in external ratings and thus provide a more accurate picture of the user expertise.

The above-described embodiments advantageously enable users to source contents that are not on their device in an intelligent and automated manner, by using pre-defined assignment parameter templates as well as mapping the templates over RDF databases. This reduces user interaction overload on the system 200 when servicing the queries.

The above-described embodiments offer tools for the media houses and content providers to effectively and efficiently reach content creators and contributors. For example, a news media company may access all journalists and readers through targeted assignment descriptions. The news media company may select contributors based on different assignment parameters such as location and user expertise, thus reducing the company's overhead in employing full-time journalists. An entrepreneur or freelancer may use the co-creation platform to find assignments, contributors, or co-contributors. Anyone can utilize the co-creation platform to source or crowd-source assignments and tasks, and to find a large number of matching contributors or contributor groups. A social media Internet site can utilize the co-creation platform to extend their services.

The processes described herein for providing a co-creation platform may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
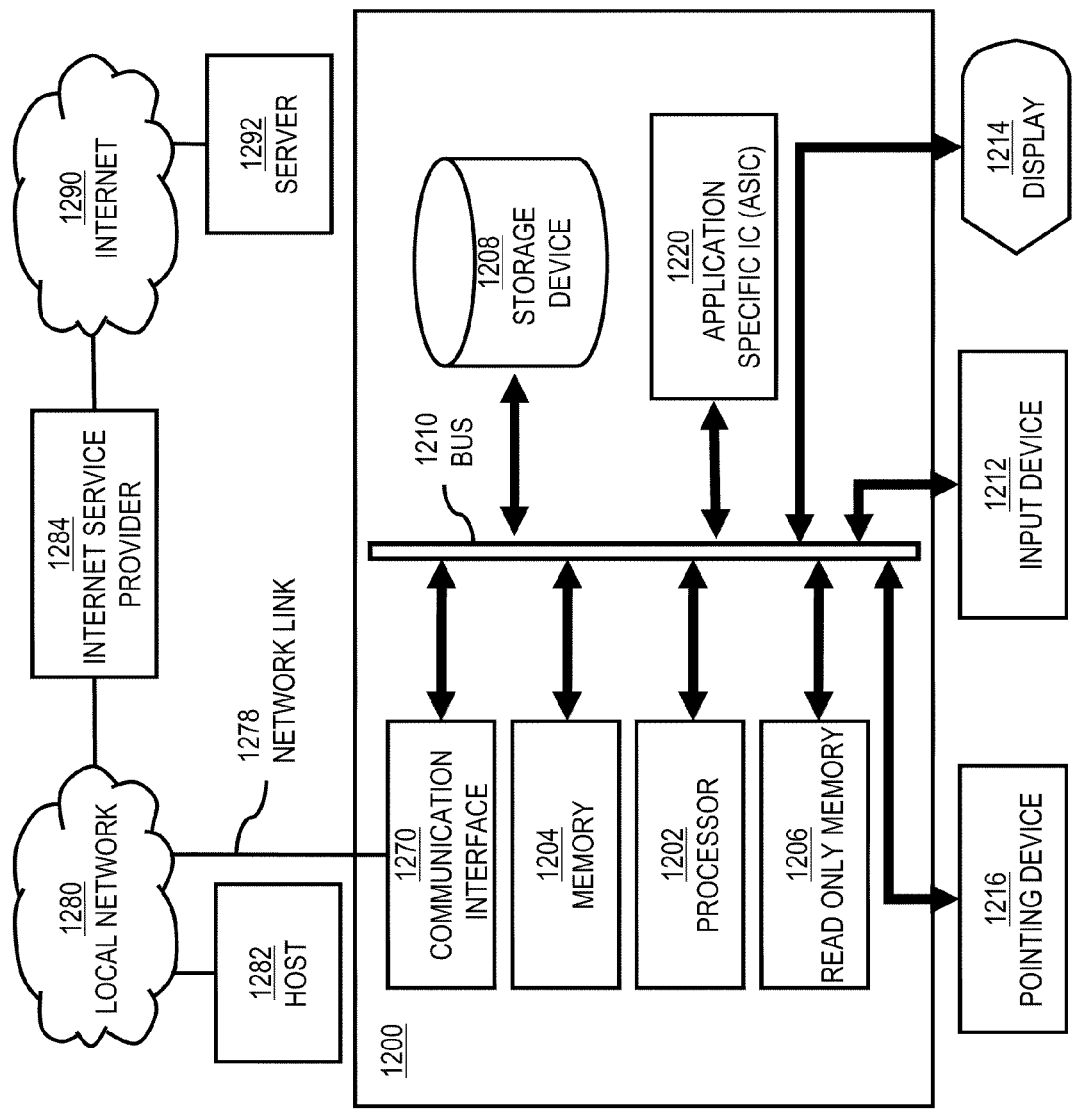
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to provide a co-creation platform as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of providing a co-creation platform.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to provide a co-creation platform. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for providing a co-creation platform. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for providing a co-creation platform, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection between the UE 201a and the communication network 205 for providing a co-creation platform.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

FIG. 13 illustrates a chip set 1300 upon which an embodiment of the invention may be implemented. Chip set 1300 is programmed to provide a co-creation platform as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1300, or a portion thereof, constitutes a means for performing one or more steps of providing a co-creation platform.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to provide a co-creation platform. The memory 1305 also stores the data associated with or generated by the execution of the inventive steps.

Figure 14:
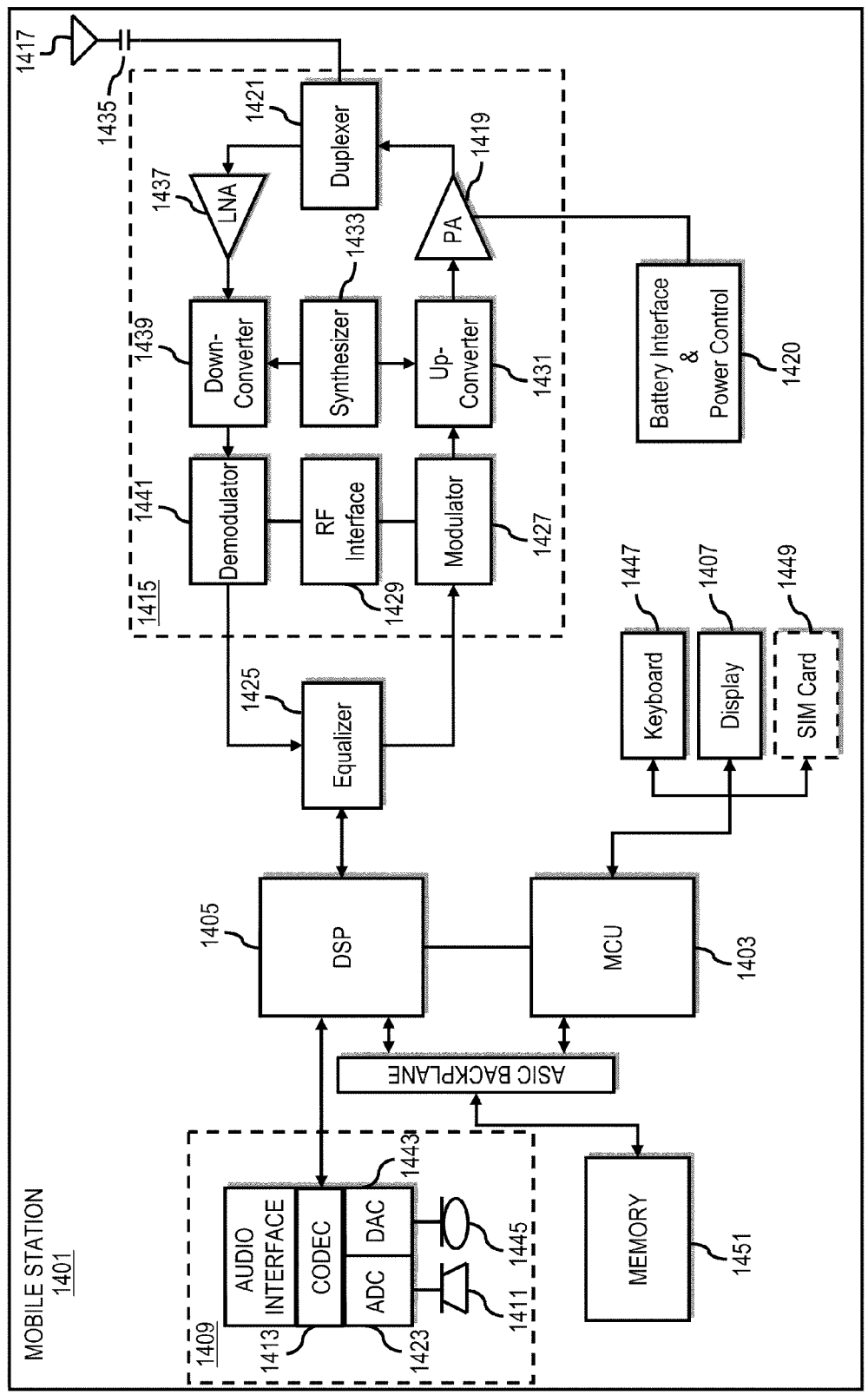
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1400, or a portion thereof, constitutes a means for performing one or more steps of providing a co-creation platform. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of providing a co-creation platform. The display 14 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to provide a co-creation platform. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone

1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    extracting tags from a plurality of information sources reflecting the expertise of a user;
    creating a model of the user's expertise by applying a probabilistic analysis on the extracted tags;
    collecting assignment information including at least one or more specified areas of expertise associated with one or more assignment tasks; and
    matching the model of the user's expertise against the specified areas of expertise associated with the one or more assignment tasks.

2. A method of claim 1, further comprising:
    clustering the tags into a plurality of tag sets based on a correlation among the tags within each of the tag sets;
    performing probabilistic matching on the tags against an expertise category model to select one or more tags in each tag set with high probabilities of matching;
    presenting the selected one or more tags to the user for confirmation; and
    inserting the confirmed one or more tags into a user profile, wherein the model of the user's expertise is created using, at least in part, the user profile.

3. A method of claim 2, further comprising:
    extracting one or more assignment tags from the assignment information;
    compiling the model of the user's expertise with a plurality of expertise models corresponding to other users;
    mapping the one or more assignment tags to the compilation of user expertise models to determine one or more best matching user expertise models; and
    selecting one or more users corresponding to the determined one or more user expertise models to take the assignment.

4. A method of claim 1, further comprising:
    calculating a first appearance frequency value of each of the tags relative to an entirety of each of the plurality of information sources;
    calculating a second appearance frequency value of each of the tags relative to one or more pages of each of the plurality of information sources in which the tag appears;
    normalizing the first and second appearance frequency values of each tag to be in a predetermined range; and
    forming a metric for each of the tags with the first and second appearance frequency values as corresponding fields in the metric,
    wherein the probabilistic analysis includes, at least in part, analysis of the metric.

5. A method of claim 4, further comprising:
    calculating a correlation value between each of the one or more categories selected for inclusion in the model of the user's expertise and each of the tags extracted from the information sources;
    obtaining an overall correlation for each of the one or more categories by adding together the correlation values corresponding to each of the respective one or more categories;
    computing a weighting factor for the each of the one or more categories by averaging the metric of the each of the tags and the overall correlation value corresponding to each of the one or more categories;
    causing, at least in part, actions that result in sending the weighting factors to the user for confirmation; and
    adjusting the model of the user's expertise based upon the weighting factors as confirmed by the user.

6. A method of claim 2, further comprising:
    receiving an input, from the user, specifying a professional or social website;
    soliciting a rating of the user based upon the one or more categories included in the model of the user's expertise by peers associated with the professional or social website; and
    adjusting the model of the user's expertise based upon the rating.

7. A method of claim 1, wherein the model of the user's expertise matches the specified areas of expertise, and the method further comprising:
    causing, at least in part, transmission of the assignment information to a mobile terminal of the user;
    extracting a content requirement from the assignment information;
    performing a query in a database for the content requirement; and
    receiving content from the database, in response to the query.

8. An apparatus comprising:
    at least one processor; and
    at least one memory including computer program code,
    the at least one memory and the computer program code configured to, with the at least one processor, cause the apparatus to perform at least the following,
        extract tags from a plurality of information sources reflecting the expertise of a user;
        create a model of the user's expertise by applying a probabilistic analysis on the extracted tags;
        collect assignment information including at least one or more specified areas of expertise associated with one or more assignment tasks; and
        match the model of the user's expertise against the specified areas of expertise associated with the one or more assignment tasks.

9. An apparatus of claim 8, wherein the apparatus is further caused to:
cluster the tags into a plurality of tag sets based on a correlation among the tags within each of the tag sets;
perform probabilistic matching on the tags against an expertise category model to select one or more tags in each tag set with high probabilities of matching;
present the selected one or more tags to the user for confirmation; and
insert the confirmed one or more tags into a user profile, wherein the model of the user's expertise is created using, at least in part, the user profile.

10. An apparatus of claim 9, wherein the apparatus is further caused to:
extract one or more assignment tags from the assignment information;
compile the model of the user's expertise with a plurality of expertise models corresponding to other users;
map the one or more assignment tags to the compilation of user expertise models to determine one or more best matching user expertise models; and
select one or more users corresponding to the determined one or more user expertise models to take the assignment.

11. An apparatus of claim 8, wherein the apparatus is further caused to:
calculate a first appearance frequency value of each of the tags relative to an entirety of each of the plurality of information sources;
calculate a second appearance frequency value of each of the tags relative to one or more pages of each of the plurality of information sources in which the tag appears;
normalize the first and second appearance frequency values of each tag to be in a predetermined range; and
form a metric for each of the tags with the first and second appearance frequency values as corresponding fields in the metric,
wherein the probabilistic analysis includes, at least in part, analysis of the metric.

12. An apparatus of claim 11, wherein the apparatus is further caused to:
calculate a correlation value between each of the one or more categories selected for inclusion in the model of the user's expertise and each of the tags extracted from the information sources;
obtain an overall correlation for each of the one or more categories by adding together the correlation values corresponding to each of the respective one or more categories;
compute a weighting factor for the each of the one or more categories by averaging the metric of the each of the tags and the overall correlation value corresponding to each of the one or more categories;
cause, at least in part, actions that result in sending the weighting factors to the user for confirmation; and
adjust the model of the user's expertise based upon the weighting factors as confirmed by the user.

13. An apparatus of claim 9, wherein the apparatus is further caused to:
receive an input, from the user, specifying a professional or social website;
solicit a rating of the user based upon the one or more categories included in the model of the user's expertise by peers associated with the professional or social website; and
adjust the model of the user's expertise based upon the rating.

14. An apparatus of claim 11, wherein the model of the user's expertise matches the specified areas of expertise, and wherein the apparatus is further caused to:
cause, at least in part, transmission of the assignment information to a mobile terminal of the user;
extract a content requirement from the assignment information;
perform a query in a database for the content requirement; and
receive content from the database, in response to the query.

15. A computer-readable storage medium carrying one or more sequences of one or more instructions which, when executed by one or more processors, cause an apparatus to at least perform the following steps:
extracting tags from a plurality of information sources reflecting the expertise of a user;
creating a model of the user's expertise by applying a probabilistic analysis on the extracted tags;
collecting assignment information including at least one or more specified areas of expertise associated with one or more assignment tasks; and
matching the model of the user's expertise against the specified areas of expertise associated with the one or more assignment tasks.

16. A computer-readable storage medium of claim 15, wherein the apparatus is caused to further perform:
clustering the tags into a plurality of tag sets based on a correlation among the tags within each of the tag sets;
performing probabilistic matching on the tags against an expertise category model to select one or more tags in each tag set with high probabilities of matching;
presenting the selected one or more tags to the user for confirmation; and
inserting the confirmed one or more tags into a user profile, wherein the model of the user's expertise is created using, at least in part, the user profile.

17. A computer-readable storage medium of claim 16, wherein the apparatus is caused to further perform:
extracting one or more assignment tags from the assignment information;
compiling the model of the user's expertise with a plurality of expertise models corresponding to other users;
mapping the one or more assignment tags to the compilation of user expertise models to determine one or more best matching user expertise models; and
selecting one or more users corresponding to the determined one or more user expertise models to take the assignment.

18. A computer-readable storage medium of claim 15, wherein the apparatus is caused to further perform:
calculating a first appearance frequency value of each of the tags relative to an entirety of each of the plurality of information sources;
calculating a second appearance frequency value of each of the tags relative to one or more pages of each of the plurality of information sources in which the tag appears;
normalizing the first and second appearance frequency values of each tag to be in a predetermined range; and
forming a metric for each of the tags with the first and second appearance frequency values as corresponding fields in the metric,
wherein the probabilistic analysis includes, at least in part, analysis of the metric.

19. A computer-readable storage medium of claim 18, wherein the apparatus is caused to further perform:

- calculating a correlation value between each of the one or more categories selected for inclusion in the model of the user's expertise and each of the tags extracted from the information sources;
- obtaining an overall correlation for each of the one or more categories by adding together the correlation values corresponding to each of the respective one or more categories;
- computing a weighting factor for the each of the one or more categories by averaging the metric of the each of the tags and the overall correlation value corresponding to each of the one or more categories;
- causing, at least in part, actions that result in sending the weighting factors to the user for confirmation; and
- adjusting the model of the user's expertise based upon the weighting factors as confirmed by the user.

20. A computer-readable storage medium of claim 16, wherein the apparatus is caused to further perform:

- receiving an input, from the user, specifying a professional or social website;
- soliciting a rating of the user based upon the one or more categories included in the model of the user's expertise by peers associated with the professional or social website; and
- adjusting the model of the user's expertise based upon the rating.

* * * * *